RESONANT COUPLING CIRCUIT

Filed Sept. 30, 1953 2 Sheets-Sheet 1

INVENTOR
J. CARL SEDDON
BY
ATTORNEYS

INVENTOR
J. CARL SEDDON

BY

Howard White ATTORNEYS 2,805,400

RESONANT COUPLING CIRCUIT

John Carl Seddon, Alexandria, Va.

Application September 30, 1953, Serial No. 383,418

7 Claims. (Cl. 333—72)

(Granted under Title 35, U. S. Code (1952), sec. 266)

This invention relates in general to the development of a new type of frequency selective electrical circuit, and more particularly to improvements in the stability and selectivity characteristics of communication type radio receivers.

In the field of radio comunications one of the most important qualities contributing to the merit of a radio receiver is the receiver's ability to reliably discriminate between closely adjacent frequency components in a given frequency spectrum. This property to receive one signal and to reject closely adjacent signals is referred to as the "selectivity" characteristic of the receiver, and in applications such as panoramic reception (see for example U. S. Patent 2,084,760 to H. H. Beverage) where a given radio frequency spectrum is periodically swept and the output of the receiver is displayed on an oscilloscope, the degree of selectivity directly affects the accuracy of the signal analysis provided by the equipment. Specifically, the greater the degree of selectivity the better the discrimination between closely adjacent frequency components and the more complete and accurate becomes the analysis.

To improve receiver selectivity, various type crystal filter circuits such as disclosed in December 1938 issue of QST on page 33, et seq. have been employed. In general, these prior art circuits are balanced, and their reliability is dependent upon maintaining this balance. Consequently, under variable temperature conditions, or where the equipment is subject to shock and vibration, the maintenance of circuit balance becomes extremely difficult and requires almost continuous attention by the operator since all of these factors tend to disturb the balance of the circuit. In addition, several of these circuits utilize a signal rejection dip variably positioned in the band pass characteristic of the receiver. Such circuits have the disadvantage in panoramic reception of causing damped oscillations to occur when an incoming signal is first received. This action, of course, distorts and in some instances obliterates the received signal and thus renders the received information unintelligible.

In addition to the foregoing there continues to exist in the design problems of superheterodyne receivers an urgent need for a receiver having good image signal rejection properties. In general, this property requires the use of high I. F. frequencies where the problem of selectivity is accentuated.

It is therefore an object of this invention to provide a highly stable, unbalanced radio frequency circuit having exceedingly high selectivity.

It is another object of this invention to provide a resonant coupling circuit admirably suited to use as an intermediate or radio frequency coupling component in a radio receiver.

It is another object of this invention to provide a high frequency, highly selective I. F. amplifier for a communication receiver.

It is still another object of the invention to provide a resonant circuit of the above type having low effective $L/C$ ratios.

It is still another object of this invention to provide a crystal circuit of the above type wherein the bandwidth, center frequency and the impedance of the circuit can be readily varied by the choice of circuit parameters.

Other objects and features of this invention will become apparent upon a careful consideration of the following detailed description when taken together with the accompanying drawings, in which:

Figure 1*a* is a schematic circuit diagram of a basic component of the present invention together with its electrically equivalent analogues.

Figures 1*b* and 1*c* respectively show in graphic form the reactance and impedance characteristic of the circuit of Figure 1*a*.

Figure 1*d* is a schematic circuit diagram of one type of resonant circuit component provided by the present invention.

Figures 2, 3, 4, 5, 6, 7:
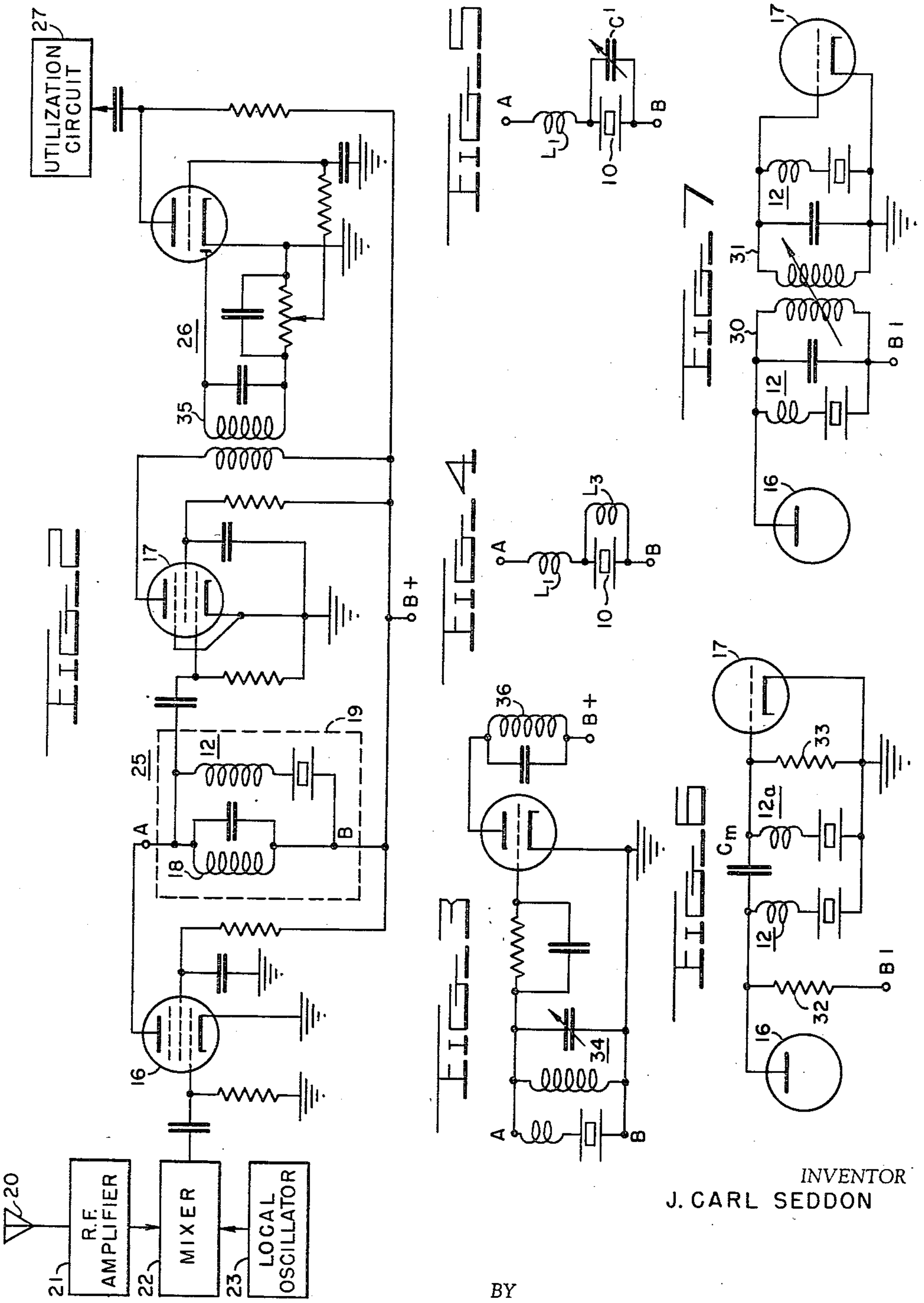
Figure 2 is a diagrammatic illustration showing partly in schematic form one practical embodiment of the present invention.
Figure 3 is a schematic illustration showing the application of the basic circuit component 12 of Fig. 1*a* to a tuned grid tuned plate oscillator.
Figures 4 and 5 illustrate in schematic form alternate types of resonant circuits incorporating the features of the present invention and useable in the practical embodiment illustrated in Figure 2.

Figures 6 and 7 schematically illustrate in a general manner alternate type interstage coupling circuits provided by the present invention.

Figure 1B:
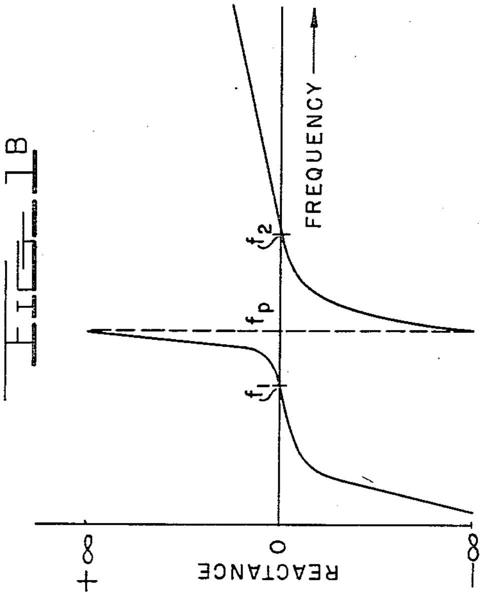
Figure 1D:
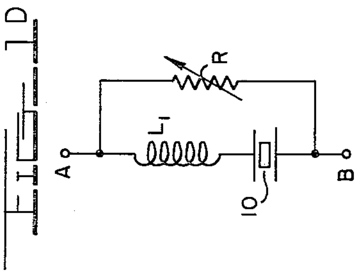
Figure 1A:
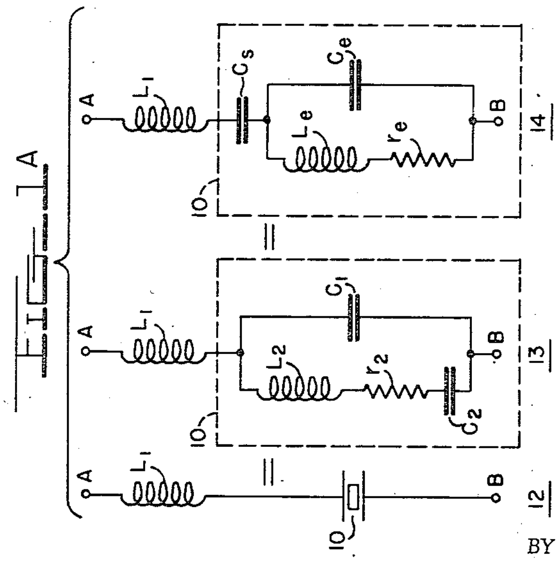

Turning to circuit 12 of Figure 1*a* of the drawing, it will be seen that the basic circuit component provided by the present invention makes use of a conventional receiver or transmitting type piezo-electric crystal element 10 connected in series with an inductance coil $L_1$. The inductance coil $L_1$ is chosen to have an inductance such as to produce series resonance with the capacity of the crystal at the parallel resonant frequency of the crystal if the crystal were replaced by a condenser having the same capacity as the crystal and holder measured at a frequency such that the crystal would not vibrate. The crystal 10 of diagram 12 may be represented by the conventional electrical equivalent circuit shown enclosed in dotted lines in diagram 13. Here, the capacitance $C_1$ represents the electrostatic capacity between the crystal electrodes when the crystal is in place but not vibrating and also any additional loading capacity placed across the crystal. The series combination $L_2$ $C_2$ and $r_2$ represent the equivalent mass, compliance, and frictional loss respectively of the vibrating crystal, and $L_1$ simply corresponds to $L_1$ in diagram 12. Likewise the conventional equivalent diagram 13 of the crystal 10 can also be represent by the electrical identity shown enclosed in dotted lines at 14 in Figure 1*a*. In this equivalent circuit the series capacity $C_s$ is equal in value to $C_1+C_2$), the shunt capacitance $C_e$ is equal to $C_1$ $$\frac{(C_1+C_2)}{C_2}$$

the inductance $L_e$ is equal to $$\frac{(C_2)^2}{(C_1+C_2)^2}L_2$$

and the resistance $r_e$ is equal to $r_2$ $$\frac{(C_2)^2}{(C_1+C_2)^2}$$

Thus to tabulate the equivalence between the crystal circuit diagrams shown at 13 and 14, the following relationships hold.

1)
$$C_s = C_1 + C_2$$

$$C_e = \frac{C_1}{C_2}(C_1 + C_2)$$

$$L_e = L_2 \frac{(C_2)^2}{(C_1 + C_2)^2}$$

$$r_e = \frac{(C_2)^2}{(C_1 + C_2)^2} r_2$$

As indicated above and in accordance with the concept of the present invention, the series inductance $L_1$ is chosen to have a value such that it will series resonate with $C_s$ at the anti-resonant frequency $f_p$ of the shunt circuit $L_e$, $C_e$, $r_e$, shown in diagram 14. Stated otherwise the resonant frequency $f_p$ of the shunt circuit of diagram 14 is equal to or approximately equal to $$\frac{1}{2\pi\sqrt{L_e C_e}}$$

which in turn is equal to the series resonant frequency $$\frac{1}{2\pi\sqrt{L_1 C_s}}$$

of the series arm $L_1C_s$. Using this relationship the conversion Equations 1 can be expressed approximately as follows:

(2)
$$L_e \approx \frac{L_1^2}{L_2}$$

$$C_e \approx \frac{L_2}{L_1} C_1$$

$$r_e \approx \left(\frac{L_1}{L_2}\right)^2 r_2$$

since $C_1$ is known inherently to be much greater than $C_2$, and the ratio $$\frac{C_1}{C_1 + C_2}$$

can be considered equal to unity.

Therefore, by choosing the inductance $L_1$ so as to series resonate with the capacity $C_s$ at the anti-resonant frequency $f_p$ of the crystal, the capacity $C_s$ can be effectively eliminated over a limited range of frequencies near $f_p$. This causes the reactance and impedance diagrams of the circuit 12 as measured between terminals A and B to depart from the conventional asymmetric diagrams characteristic of a crystal to the more symmetrical diagrams indicated by Figures 1*b* and 1*c*. Turning first to the reactance diagram Figure 1*b*, it may be seen that for frequencies far below the crystal anti-resonant frequency $f_p$ the reactance of the circuit is first largely capacitative due to the large capacitative reactance of the series arm $L_1C_s$. As the frequency is increased toward the anti-resonant frequency $f_p$, a point is reached at a frequency $f_1$ below anti-resonance $f_p$ where the capacitative reactance of the series arm $L_1C_s$ is equal to and series resonant with the inductive reactance of the shunt arm $L_e$, $C_e$, $r_e$. At frequencies immediately above $f_1$ the inductive reactance of the shunt arm $L_e$, $C_e$, $r_e$ exceeds the capacitive reactance of the series arm $L_1C_s$ until the anti-resonant frequency $f_p$ is reached. At this frequency the series arm $L_1C_s$ is series resonant and theoretically possesses no reactance and the impedance of the network between terminals A and B is simply the shunt or dynamic impedance of the shunt circuit $L_e$, $C_e$, $r_e$. Above the anti-resonant frequency $f_p$ and below the frequency $f_2$, the capacitative reactance of the shunt circuit $L_e$, $C_e$, $r_e$ predominates over the inductive reactance of the series circuit $L_1C_s$ until the frequency $f_2$ is reached where these opposing reactance values are equal. At this point a second series resonance occurs. At frequencies above the second series resonance point $f_2$ the circuit displays an inductive reactance.

Figure 1C:
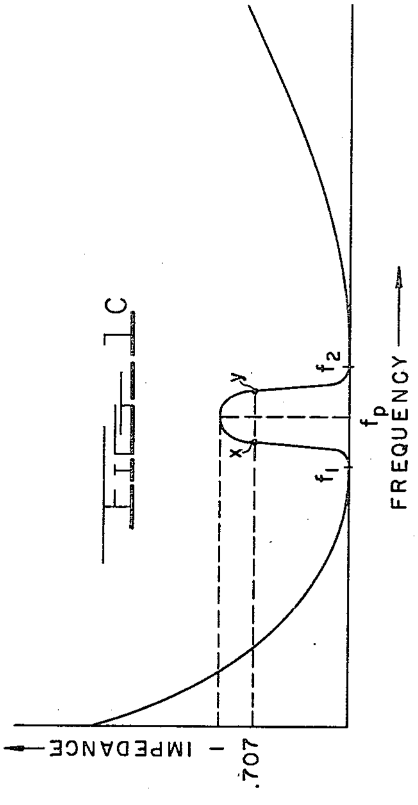

Thus from the reactance diagram of Figure 1*b*, it becomes apparent that the impedance characteristic between the terminals A and B of the circuit 12 of Figure 1*a* is as indicated in Figure 1*c*; which, it will be observed, closely resembles (at frequencies near $f_p$, the universal resonance curve of a simple parallel L. C. circuit. The response of the circuit at frequencies near $f_p$ and between $f_1$ and $f_2$ is essentially that of a high Q parallel L. C. circuit and the response for frequencies below $f_1$ and above $f_2$ is that of a series resonant circuit.

The Q of the circuit, which may be mathematically defined as equal to $$2\pi\frac{f_p L_2}{r_2}$$

or qualitatively defined as the ratio between the resonant frequency $f_p$ and the difference in frequencies between upper and lower half power points $x$ and $y$ on the impedance curve of Figure 1*c*, is equal to the Q of the crystal. Likewise the stability of the circuit is as good as the stability of the crystal.

The percentage frequency range over which the basic circuit 12 of Figure 1*a* behaves very nearly as a parallel resonant circuit can be mathematically expressed approximately as follows:

(3)
$$2\partial = \sqrt{\frac{L_1}{L_2}}$$

where $$\partial = \frac{f_p - f_1}{f_p} \text{ or } \frac{f_2 - f_p}{f_p}$$

Although the minimum impedance points of Fig. 1*c* (series resonant frequencies $f_1$ and $f_2$) are difficult to measure accurately due to their breadth, the accuracy of Equation 3 was experimentally checked by using an AT cut transmitting crystal having the following measured parameters:

$f_p$=848.4 kilocycles
$C_1$=19 $\mu\mu$fds.
$L_2$=4.4 henries
$R_p$=544,000 ohms (dynamic impedance)
$Q$=129,000

The series resonating inductance $L_1$ was set at 1.86 millihenries. This circuit was found to produce measured series resonant frequencies $f_1$ and $f_2$ at ±9.4 kc. removed from $f_p$. Equation 3 yields a value of ± 8.8 kc. for these frequencies which is only in about 7% error of the measured value, and therefore adequate for most design purposes.

From the foregoing qualitative definition of Q it is apparent that utilizing a circuit of the foregoing type wherein the Q of the crystal is 129,000 and the center frequency $f_p$ is 848.4 kc., the bandwidth of the basic circuit component 12 when taken alone is approximately only 7 cycles wide. Consequently, in various receiver applications, particularly in communication work, it may be discovered that the Q of the basic circuit 12 of Figure 1*a* is too great for the faithful reproduction of communication signals. Accordingly, when the basic circuit 12 is used as an I. F. coupling component or the like in a receiver it may be frequently desired to reduce the Q of the circuit. This may be done by paralleling the circuit terminals A and B with other impedance elements such as a resistor as shown in Figure 1*d* or a parallel tuned circuit as shown in Figure 2.

If a resistor is used to parallel the circuit 12 of Figure 1*a* as shown in Figure 1*d* the Q′ of the resulting combination circuit may be mathematically expressed as follows:

(4)
$$Q' = \frac{RR_p}{2\pi f_p L_e (R + R_p)}$$

where $R_p$ is the dynamic impedance of the crystal circuit equal to $(Q)(2\pi f_p L_e)$ (Q being the Q of the crystal) and R is the shunting resistor.

Simplifying Equation 4 the Q′ of the resulting circuit may be further expressed as follows:

$$Q' = Q\frac{R}{R+R_p} \tag{5}$$

Accordingly, by utilizing various size shunting resistors R the Q′ of the resulting circuit can be reduced as desired. For example, the following table indicates in a general way how the Q′ of the foregoing 848.4 kc. crystal circuit was reduced and the bandwidth broadened by varying the shunting resistor R.

| R (Kilohms) | Q′ (measured) | Q′ (Equation 5) | Bandwidth (measured), cycles |
|---|---|---|---|
| 75 | 15,400 | 15,700 | 55 |
| 27.2 | 6,050 | 6,140 | 140 |
| 14.5 | 3,265 | 3,360 | 260 |
| 7.3 | 1,740 | 1,710 | 488 |

From the foregoing analysis it will be recognized that the tuned circuits of Figure 1*d* or 12 of Figure 1*a* make an ideal frequency selective plate or grid load for a vacuum tube amplifier system, particularly for either an I. F. or R. F. amplifier to obtain high degrees of frequency selectivity and stability.

Instead of using a simple resistor R to lower the Q of the circuit, a parallel tuned circuit resonant at $f_p$ may be used. In this case the bandwidth is essentially the same as though a resistor R having a value of Q″X ohms were used where Q″ is the Q of the paralleling tuned resonant circuit and X is the reactance of either reactive element forming the circuit, providing Q″ is very much less than the Q of the crystal circuit.

This last mentioned application utilizing a parallel resonant circuit to shunt the basic crystal circuit is shown in more detail in Figure 2 where the basic circuit 12 is shown incorporated in the I. F. amplifier of a superheterodyne communication receiver.

In this diagram, 20 designates the antenna to which the R. F. amplifier 21 of the receiver is coupled. The output of the R. F. amplifier is fed to a conventional mixer 22 where the received signals are heterodyned with the output of a local oscillator 23 to produce the desired I. F. frequency. The resulting I. F. output of the mixer is then amplified by the I. F. amplifier indicated generally at 25 and fed through a detector 26 to a utilization circuit 27. For purposes of simplification only a two stage I. F. amplifier 25 is shown, but it must be understood that many more stages of I. F. amplification may be and are frequently used in sensitive communication receivers. As depicted in the figure the I. F. amplifier comprises a pair of pentode vacuum tube amplifiers 16 and 17 which are impedance coupled in cascade. The plate load 19 of the first amplifier 16 comprises a conventional parallel tuned LC circuit 18 shunted by the crystal circuit 12. As indicated by the circuit diagram the crystal and inductance circuit 12 is used to shunt the tuned LC circuit 18 of the first I. F. stage 16 to provide a stable and yet selective amplifier system, the Q of which is increased over the Q of the LC circuit alone by a factor which is proportional to the Q of the crystal and depends to a small extent on the dynamic impedance of the circuit 12. The impedance characteristic of the resulting network between terminals A and B will differ from that shown in Figure 1*a* in that the reactance of the network will be zero at the zero and infinite frequency points with side responses appearing on each side of the normal parallel resonant frequency of the tuned LC circuit 18 due to parallel resonance between the LC circuit 18 and the crystal circuit 12. These side responses, however, will normally be conveniently suppressed by the subsequent tuned circuit 35 of the second stage. The position of the side responses but not the center response can be changed by using different LC ratios for the tuned circuit 18.

It is apparent from the circuit of Figure 2 that the basic circuit component of the present invention comprising the inductance and the crystal in series as shown at 12 in Figure 1*a* as well as the circuit shown in Figures 1*d*, 4 and 5 can be made as plug-in units adapted to be plugged in across the tuned circuit 18 of an I. F. or R. F. amplifier of an existing superheterodyne receiver as indicated by the diagram shown in Figure 2 thereby to provide a simple and straight forward component for increasing the selectivity of the existing radio receiver. In instances where the receiver stage being shunted by the plug-in unit is of high impedance it may be desired to incorporate an impedance matching section in the plug-in unit to avoid loss of gain.

If it is desired to reduce the impedance of the circuit of Figure 1*a* as is frequently the case in receiver applications, the circuit of Figure 5 can be used. In this embodiment the value of $C_1$ (Equation 2) is padded by a condenser C′, variable or fixed, shunted across the crystal 10. Thus capacitor C′ adds to the value of $C_1$ to thereby lower the $L_e/C_e$ ratio of the equivalent circuit. Thus in this circuit the magnitude of $L_1$ in Figure 5 is slightly less than the magnitude of $L_1$ in Figure 1*a* but the same conditions of series resonance must hold as previously described. The frequency of resonance will be slightly lower than previously but the change is very slight and the capacitor C′ shunting the crystal 10 can be made very large if desired.

On the other hand, the basic circuit component 12 may have an impedance lower than desired or too high a Q in which case a circuit such as shown in Figure 4 can be employed. As indicated, this circuit comprises the circuit 12 of Figure 1*a* with an inductance $L_3$ having good Q connected in shunt with the crystal 10. The magnitude of $L_3$ is chosen so that some of the equivalent capacity $C_1$ can be effectively eliminated by resonating the amount of capacity it is desired to eliminate with the inductance $L_3$ at the resonant frequency $f_p$.

While the circuits of Figs. 1*d*, 4, 5 and the diagram 12 of Fig. 1*a* may be ideally suited for manufacture as plug-in units adapted to be plugged-in across one of the tuned circuits of an existing radio receiver as generally indicated in Fig. 2, it will be equally apparent that these same circuits can directly replace the entire circuit 19 between terminals A and B of Fig. 2. In either event a receiver offering excellent selectivity and stability and yet is free of the use of critically balanced circuits is obtained. Also since crystals operable at frequencies in excess of 5 megacycles are now readily available, the application of the present invention as a tuned coupling component in the I. F. amplifier of a superheterodyne receiver yields a receiver having excellent image signal rejection properties.

In some applications it may be desired to operate with somewhat wider bandwidths than may conveniently be obtained by the singly tuned circuits of the type described above. In this case a stagger tuned amplifier similar to conventional television amplifiers made up of a multiplicity of stages coupled together by stagger tuned circuits of the type described above may be used, or alternately mutual coupling may be employed. The conventional double tuned transformer coupling circuit of Figure 7 readily lends itself to this latter arrangement in that the mutual inductive coupling of the transformer windings 30 and 31 may be readily varied to obtain the desired degree of coupling. In this embodiment separate crystal circuits 12 each tuned to the frequency of the double tuned transformer shunt the transformer primary and secondary windings. Critical coupling in this case is not determined by the Q of the crystals but depends upon the Q of the coils. By arranging one of the coils on an insulating rod so it can be moved with respect to the other coil it is possible to adjust the coefficient of coupling. An alternate type of over coupled circuit is shown in Figure 6, where two crystal circuits 12 and 12a each tuned to the same frequency are shunted by separate bandwidth broadening resistors 32 and 33. Each of the crystal circuits and its associated shunting resistor forms a circuit similar to that shown by Fig. 1*d*. These circuits are then coupled together by a capacitor $C_m$ the value of which is equal to $$K\sqrt{C_pC_s}$$

where K equals the coefficient of coupling desired and $C_p$ and $C_s$ are the effective capacities of primary and secondary respectively.

Circuit 12 of Figure 1*a* of the present invention also lends itself very handily to crystal controlled oscillator applications such as the tuned grid tuned plate circuit of Figure 3. In this embodiment the series inductance crystal circuit 12 shunts the tuned *L/C* grid circuit 34 to provide the desired degree of frequency stability. The plate circuit includes the L. C. tuned circuit 36 which operates to eliminate the side responses caused by the presence of the grid *L/C* circuit 34 as described above. The tuning capacitor in the grid circuit *L/C* permits very slight but stable adjustment of the frequency.

In a typical embodiment utilizing a regenerative amplifier oscillator with a 3.87 megacycle crystal and a 100 microfarad tuning condenser, the frequency variation obtained extended from 3.879 megacycles to 3.868 megacycles. The amplitude of the signal output of the oscillator did not vary more than 10% over this frequency range and the frequency of operation at any setting remains exceedingly stable. These characteristics render the oscillator extremely well suited for use in frequency modulation applications where stabilized carrier frequencies are desired. Similarly in an I. F. amplifier using the capacity coupling of Figure 6 and having a center frequency of 848.4 kilocycles per second and shunting resistors of 5 kilohms, a half-power point bandwidth of 600 cycles per second was achieved using a 43 $\mu\mu$fd. condenser for $C_m$. Increasing $C_m$ to 51 $\mu\mu$fd. increased the bandwidth to 750 cycles.

The circuit of the present invention has great advantages in its simplicity and its adaptability in that it can in its various forms as indicated in the drawing be readily installed in any existing receiver so as to improve the selectivity of the receiver. Alternatively the receiver can be designed initially with the various embodiments of the invention incorporated therein whereby a receiver of good stability and selectivity inherently results.

Although I have shown and described only certain limited and specific embodiments of the present invention, it must be understood that I am fully aware of the other many modifications possible thereof. Therefore this invention is not to be restricted except insofar as is indicated by the spirit of the disclosure.

The invention described herein may be manufactured and used by or for the Government of the United States of America for governmental purposes without the payment of any royalties thereon or therefor.

What is claimed is:

1. A resonant circuit comprising in combination, a piezo-electric crystal circuit and a parallel tuned inductance-capacitance circuit tuned to substantially the antiresonant frequency of the crystal circuit directly shunting said crystal circuit, said crystal circuit including a piezoelectric crystal element and an inductance connected in series therewith, said inductance having a magnitude operative to series resonate the combined capacity of the crystal, its holder and any capacity shunting the holder at the antiresonant frequency of the crystal.

2. A coupling circuit comprising a double tuned transformer including primary and secondary parallel tuned circuits each tuned to substantially the same frequency, a first piezo-electric crystal element and a first inductance in series therewith shunting the primary tuned circuit of said transformer, a second piezo-electric crystal element and an inductance in series therewith shunting the secondary tuned circuit of the transformer, each of said piezo-electric crystal elements exhibiting antiresonance of substantially the tuned frequency of said tuned circuits, and each of said inductances having a magnitude operative to series resonate the combined capacity of the respective crystal, its holder and any capacity shunting the holder at the antiresonant frequency of the crystal.

3. A coupling circuit comprising a double tuned transformer including primary and secondary parallel tuned circuits each tuned to substantially the same frequency, a first piezo-electric crystal element and a first inductance in series therewith shunting the primary tuned circuit of said transformer, a second piezo-electric crystal element and a second inductance in series therewith shunting the secondary tuned circuit of the transformer, each of said piezo-electric crystal elements exhibiting anti-resonance at substantially the tuned frequency of said tuned circuits, and each of said inductances having a magnitude operative to series resonate the combined capacity of the respective crystal, its holder and any capacity shunting the holder at the anti-resonant frequency of said crystal elements; plus means for varying the coefficient of coupling between said primary tuned circuit and said secondary tuned circuit.

4. Frequency selective means for coupling between two stages connected in cascade comprising a first pair of terminals across which the output of one of said two stages may be applied; a second pair of terminals across which the input to the other of said two stages may be applied; means coupling said first pair of terminals to said second pair of terminals; resonant circuit means connected to at least one of said pairs of terminals; said resonant circuit means including a piezo-electric crystal element and an inductance which are connected in series and directly in shunt with said one of said pairs of terminals, said inductance having a magnitude operative to series resonate the combined capacity of the crystal, its holder and any capacity shunting the holder at the antiresonant frequency of the crystal.

5. Frequency selective means for coupling between two stages connected in cascade comprising a first pair of terminals across which the output of one of said two stages may be applied; a second pair of terminals across which the input to the other of said two stages may be applied; means coupling said first pair of terminals to said second pair of terminals; resonant circuit means connected in shunt with each of said pairs of terminals; said resonant circuit means including a piezo-electric crystal element and an inductance which are connected in series and directly in shunt with the respective pair of said pairs of terminals; said inductance having a magnitude operative to series resonate the combined capacity of the crystal, its holder and any capacity shunting the holder at the anti-resonant frequency of the crystal.

6. Frequency selective means for coupling between two stages connected in cascade comprising a first pair of terminals across which the output of one of said two stages may be applied; a second pair of terminals across which the input to the other of said two stages may be applied; capacitive means coupling said first pair of terminals to said second pair of terminals; resonant circuit means connected in shunt with at least one of said pair of terminals; said resonant circuit means including a piezoelectric crystal element and an inductance which are connected in series and directly in shunt with said one of said pairs of terminals, said inductance having a magnitude operative to series resonate the combined capacity of the crystal, its holder and any capacity shunting the holder at the anti-resonant frequency of the crystal.

7. Frequency selective means for coupling between two stages connected in cascade comprising a first pair of terminals across which the output of one of said two stages may be applied; a second pair of terminals across which the input to the other of said two stages may be applied; inductive means coupling said first pair of terminals to said second pair of terminals; resonant circuit means connected in shunt with at least one of said pairs of terminals; said resonant circuit means including a piezo-electric crystal element and an inductance which are connected in series and directly in shunt with said one of said pairs of terminals; said inductance having a magnitude operative to series resonate the combined capacity of the crystal, its holder and any capacity shunting the holder and any capacity shunting the holder at the anti-resonant frequency of the crystal.

References Cited in the file of this patent

UNITED STATES PATENTS

| | | |
|---|---|---|
| 2,005,083 | Hansell | June 18, 1935 |
| 2,045,991 | Mason | June 30, 1936 |
| 2,154,849 | Kamenarovic | Apr. 18, 1939 |
| 2,309,602 | Koch | Jan. 26, 1943 |